United States Patent [19]

Assard

[11] Patent Number: 4,799,202
[45] Date of Patent: Jan. 17, 1989

[54] COMPLEMENTARY INTERFEROMETRIC HYDROPHONE

[75] Inventor: Gerald L. Assard, Waterford, Conn.

[73] Assignee: The United States of America as represented by the Secretary of the Navy, Washington, D.C.

[21] Appl. No.: 423,941

[22] Filed: Sep. 27, 1982

[51] Int. Cl.[4] .......................................... H04R 23/00
[52] U.S. Cl. ............................... 367/149; 350/96.29; 356/345
[58] Field of Search .................. 367/15, 19, 20, 149, 367/140, 141, 154, 153, 171, 159, 160, 161, 165, 170; 350/96.15, 96.29, 96.30, 96.21, 96.23, 96.33; 73/627, 644, 653, 655; 356/345

[56] References Cited

U.S. PATENT DOCUMENTS

| | | | |
|---|---|---|---|
| 3,798,474 | 3/1974 | Cassand et al. | 367/169 X |
| 3,939,466 | 2/1976 | Horwath | 367/153 |
| 3,990,034 | 11/1976 | Abbott | 367/171 X |
| 4,183,010 | 1/1980 | Miller | 367/171 X |
| 4,239,335 | 12/1980 | Stiles | 350/96.3 X |
| 4,363,533 | 12/1982 | Stowe et al. | 367/96.29 X |
| 4,375,680 | 3/1983 | Cahill et al. | 367/178 X |
| 4,405,198 | 9/1983 | Taylor | 367/169 X |
| 4,407,561 | 10/1983 | Wysocki | 350/96.3 |
| 4,415,230 | 11/1983 | Keck | 350/96.3 X |
| 4,422,167 | 12/1983 | Shajenko | 367/153 X |
| 4,433,291 | 2/1984 | Yariv et al. | 350/96.29 |

FOREIGN PATENT DOCUMENTS 0638908 9/1978 U.S.S.R. .................. 367/169

OTHER PUBLICATIONS

Jackson et al., Elimination of Drift in a Single Mode Optical Fiber Interferometer Using a Piezoelectrically Stretched Coiled Fiber, Applied Optics, vol. 19, No. 17, 9/1/80, pp. 2926–2929.

Carome et al., Optical Fiber Acoustic Sensor, Conference Fiber Optics Advances in Research and Development, Kingston, RI, Jun. 19–23, 1978, pp. 657–676.

*Primary Examiner*—Brian S. Steinberger
*Attorney, Agent, or Firm*—Arthur A. McGill; Prithvi C. Lall; Michael J. McGowan

[57] ABSTRACT

A cylindrical interferometric hydrophone having an axial hollow free-flooded volume includes an outer fiber wrap for a sensor leg and an inner fiber wrap for a reference leg. Both inner and outer fiber wraps are wound on elastomers and exposed to seawater for sensing acoustic signals. In operation an increased pressure shortens the outer wrap and lengthens the inner wrap. This use of both the sensor and the reference legs to detect signals gives increased sensitivity.

8 Claims, 1 Drawing Sheet

COMPLEMENTARY INTERFEROMETRIC HYDROPHONE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

Optical hydrophones are being developed to be deployed as acoustic sensors. An interferometric system has been devised that utilizes optical hydrophones for deployment at sea.

(2) Description of the Prior Art

In a typical interferometric system a sensor hydrophone is exposed to the acoustic pressure medium and a reference leg is isolated from the acoustic pressure medium. Both hydrophone and reference leg are constructed so that if the acoustic pressure medium were removed from the sensor hydrophone then both the sensor hydrophone and reference leg would have identical outputs. It is due to the fact that in an interferometric system the output signal of the sensor hydrophone differs from that of the reference leg that enables the system to operate. The sensor hydrophone develops a signal from the acoustic pressure medium that the reference leg does not see. This enables an output to be developed once the signals from the sensor hydrophone and reference leg are recombined.

SUMMARY OF THE INVENTION

The present invention provides a fiber optic interferometric system having two sensors that are subjected to the acoustic pressure medium. Their operation is 180° out of phase with each other. The conventional passive reference leg of the interferometer becomes an active integral part of the acoustic interferometric hydrophone. The sensor leg and reference leg are both subjected directly into the acoustic pressure medium. When the sensor leg lengthens the reference leg contracts and vice versa.

DESCRIPTION OF THE PREFERRED EMBODIMENT

Figure 1:
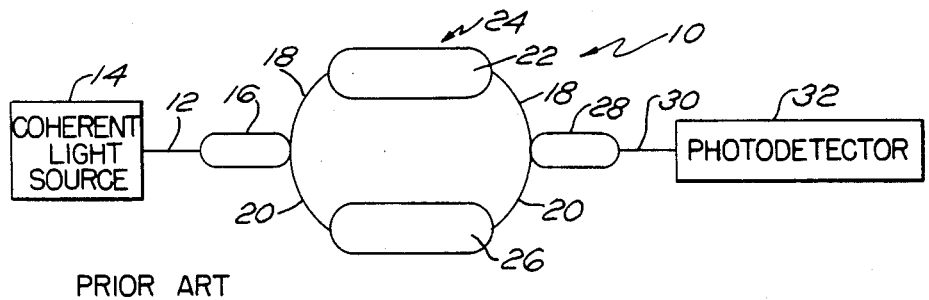
FIG. 1 is a diagram of a typical fiber optic interferometer system.

Referring now to FIG. 1 there is shown a block diagram of a typical fiber optic interferometric hydrophone system 10 which is helpful in understanding the present invention. In FIG. 1 an optical fiber 12 provides a light path from a coherent light source 14 to a three dB coupler 16. This three dB coupler 16 divides the single coherent light into two equal energy coherent light paths. One path is through the sensor optical fiber 18 and the other through the reference optical fiber 20. The sensor optical fiber 18 must be lengthy to provide for sensitivity. Typical lengths in use range from fifty to two hundred meters. This lengthy fiber 18 is wound onto a mandrel 22 to provide for a hydrophone 24. A typical hydrophone mandrel 22 may be from four to forty centimeters in length with a length to diameter ratio ranging from one to forty.

The reference path fiber 20 must match the length of the sensor path fiber 18. Hence, the reference path fiber 20 is wound onto a second mandrel 26. The reference mandrel 26 can have different length to diameter dimensions than those pertaining to the sensor mandrel 22. The reference leg comprising fiber 20 and mandrel 26 must be completely isolated and removed from the acoustic medium of interest. The coherent light of the continuing sensor path fiber 18 is combined in the second three dB coupler 28 with the continuing leg of the reference path fiber 20. The three dB coupler 28 acts like a detector to extract the acoustic modulation that appears on the sensor fiber 18 due to the acoustic pressure fluctuations imposed onto the hydrophone sensor 24. The fiber wound mandrel hydrophone sensor 24 produces dimensional changes in the fiber which in turn alter the coherent light path length. The independent path length variations will appear as noise in the three dB coupler 28. The acoustic generated change in path lengths of the sensor fiber 18 produce a phase shift relative to the coherent light of the reference fiber 20. These differences are combined in three dB coupler 28 to develop an intensity modulated light that is available for monitoring in the output fiber 30. The output fiber 30 is then terminated into a photodetector 32 to convert the light energy into electrical energy for processing.

Figure 2:
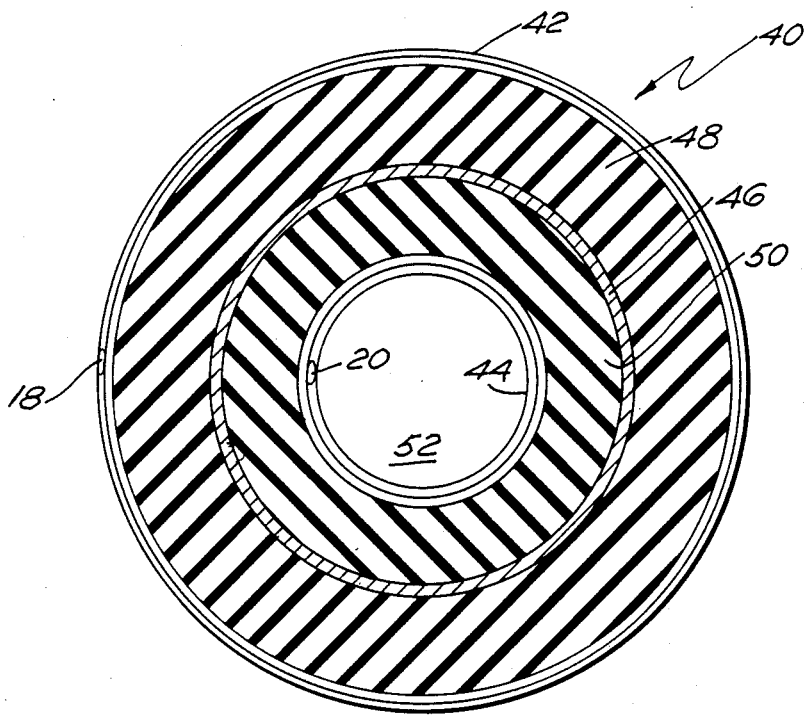
FIG. 2 shows a complementary interferometric hydrophone sensor pair in accordance with the present invention.

The optics of the interferometric hydrophone 10 do not provide for the reference leg detecting the acoustic signal and enhancing the signal provided by the sensor hydrophone 24. FIG. 2 describes such a device.

Referring now to FIG. 2 there is shown a complementary hydrophone 40 that has a concentric complementary interferometric hydrophone sensor pair 42 and 44. The sensor 42 having the sensor leg fiber 18 is referred to as sensor-S and the sensor 44 having the reference leg fiber 20 is called sensor-R. The conventional interferometric hydrophone requires the sensor in the reference leg to be removed from the acoustic stimuli to provide for a passive reference leg of the interferometer. The system presented here places both the sensor-S 42 and the sensor-R 44 into the acoustic pressure medium, thereby forcing the sensor-R 44 to play an active role as one leg of the interferometric hydrophone sensor pair 42 and 44.

In the system 40, a rigid tube 46 provides a stiff concentric form to which elastomers 48 and 50 are bonded. The sensor-R 42 is wound on to the outer elastomer 48. The fiber sensor-R 44 is bonded to the inside of the inner elastomer 50. The inside open space 52 is free flooded to expose the total outer and inner surface areas to the acoustic pressure variations. A positive pressure will force the concentric outer fiber sensor-S 42 inward and, therefore, produce a reduction in its total length. The inner concentric fiber sensor-R 44 will expand and, therefore, produce an increase in its fiber length in response to the same instantaneous positive going pressure. The sensors length variations are just reversed for negative pressure variations.

This approach permits both legs 42 and 44 of the interferometric hydrophone 40 to be placed directly into the acoustic medium. The acoustic stimulated light path changes generated within each of the fiber wound sensors 42 and 44 supports interferometric detection and also provides for an overall increase in sensitivity.

Figure 3:
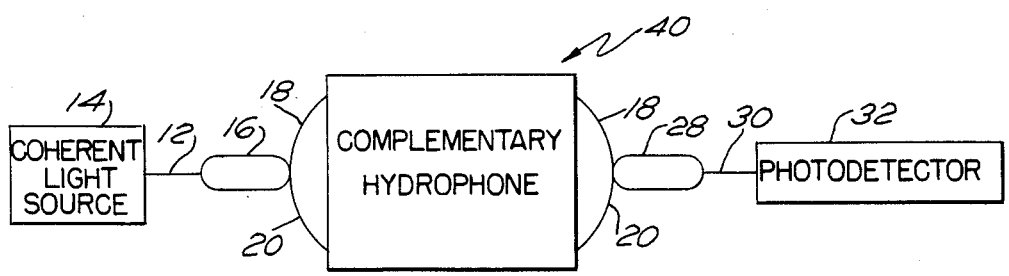
FIG. 3 shows a diagram of a fiber optic interferometer system utilizing the sensor pair of FIG. 2.

FIG. 3 shows a system arrangement wherein similar components to those of FIG. 1 have the same identifying number. The difference in FIG. 3 is that the interferometric hydrophone 40 of FIG. 2 replaces both the reference leg mandrel 26 with its fiber wrap and the mandrel hydrophone 24 of FIG. 1. In operation the coupler 28 of FIG. 3 senses opposing signals coming from fibers 18 and 20 thereby enabling an increase in detected levels.

There has therefore been described a fiber optic interferometer employing both legs as acoustic sensors to provide for an increase in acoustic sensitivity. Placing both legs in the same acoustic medium increases thermal stability and eliminates the need to insure acoustic isolation of the conventional passive reference leg. The inventive system has reduced weight and size as well as a conservation in the real estate requirements of the acoustic interferometric hydrophone channel.

Alternatively, the two sensor legs of an interferometer could be spaced at one half wave length from each other to present a 180° phase difference in their perspective acoustic instantaneous pressure variations.

It will be understood that various changes in the details, materials, steps and arrangement of parts, which have herein been described and illustrated in order to explain the nature of the invention may be made by those skilled in the art within the principle and scope of the invention as expressed in the appended claims.

What is claimed is:

1. A concentric complementary interferometric hydrophone comprising:
   a rigid cylindrical tube;
   a first elastomer applied on the outside of said tube;
   a first optic fiber wound around said first elastomer;
   a second elastomer applied on the inside of said tube;
   a second optic fiber wound inside said second elastomer; and
   an axial aperture adapted to be free flooded located along the central axis of said second elastomer.

2. A concentric complementary interferometric hydrophone comprising:
   a rigid cylindrical tube;
   first optical expansion and contraction means connected to the outside of said rigid cylindrical tube for expanding and contracting upon receipt of acoustic pressure; and
   second optical expansion and contraction means connected to the inside of said rigid cylindrical tube for expanding and contracting 180° out of phase with said first optical expansion and contraction means upon receipt of said acoustic pressure.

3. A concentric complementary interferometric hydrophone system comprising:
   a coherent light source;
   a first coupler for dividing said coherent light source into two paths, said coupler optically connected to said coherent light source;
   a concentric complementary interferometric hydrophone optically connected to provide for said two paths of said first coupler, said concentric interferometric hydrophone having an axial aperture adapted to be free flooded, said concentric interferometric hydrophone further comprising a rigid cylindrical tube, a first elastomer applied on the outside of said tube, a first optic fiber wound around said first elastomer, a second elastomer applied on the inside of said tube, and a second optic fiber wound inside said second elastomer;
   a second coupler optically connected to receive signals from said complementary interferometer; and
   a photodetector optically connected to receive signals from said second coupler.

4. A concentric complementary interferometric hydrophone system comprising:
   a coherent light source;
   a first coupler for dividing said coherent light source into two paths, said coupler optically connected to said coherent light source;
   a concentric complementary interferometric hydrophone optically connected to provide for said two paths of said first coupler, said concentric complementary interferometric hydrophone comprising a rigid cylindrical tube, first optical expansion and contraction means connected to the outside of said rigid cylindrical tube for expanding and contracting upon receipt of acoustic pressure, and second optical expansion and contraction means connected to the inside of said rigid cylindrical tube for expanding and contracting upon receipt of acoustic pressure 180° out of phase with said first optical expansion and contraction means;
   a second coupler optically connected to receive signals from said complementary interferometer; and
   a photodetector optically connected to receive signals from said second coupler.

5. A complementary interferometric hydrophone comprising:
   first optical expansion and contraction means for expanding and contracting upon receipt of acoustic pressure; and
   second optical expansion and contraction means for expanding and contracting 180° out of phase with said first optical expansion and contraction means upon receipt of said acoustic pressure.

6. A concentric complementary interferometric hydrophone system comprising:
   a coherent light source;
   a first coupler for dividing said coherent light two paths, said coupler optically connected to said coherent light source;
   a concentric complementary interferometric hydrophone optically connected to provide for said two paths of said first coupler, said concentric complementary interferometric hydrophone comprising first optical expansion and contraction means for expanding and contracting upon receipt of acoustic pressure, and second optical expansion and contraction means for expanding and contracting upon receipt of acoustic pressure 180° out of phase with said first optical expansion and contraction means;
   a second coupler optically connected to receive signals from said complementary interferometer; and
   a photodetector optically connected to receive signals from said second coupler.

7. A concentric complementary interferometric hydrophone comprising:
   a rigid cylindrical tube;
   first optical means including a first optic fiber connected to the outside of said rigid cylindrical tube for increasing and decreasing the length of said first optic fiber upon receipt of acoustic pressure; and
   second optical means including a second optic fiber connected to the inside of said rigid cylindrical tube for increasing and decreasing the length of said second optic fiber opposite to that of said first optic fiber upon receipt of said acoustic pressure.

8. A concentric complementary interferometric hydrophone comprising:

first optical means including a first optic fiber for increasing and decreasing the length of said first optic fiber upon receipt of acoustic pressure; and second optical means including a second optic fiber for increasing and decreasing the length of said second optic fiber opposite to that of said first optic fiber upon receipt of said acoustic pressure.

* * * * *